(12) United States Patent
Kunze et al.

(10) Patent No.: US 9,823,927 B2
(45) Date of Patent: Nov. 21, 2017

(54) RANGE SELECTION FOR DATA PARALLEL PROGRAMMING ENVIRONMENTS

(71) Applicant: Intel Corporation, Santa Clara, CA (US)

(72) Inventors: Aaron R. Kunze, Portland, OR (US); Dillon Sharlet, Portland, OR (US); Andrew E. Brownsword, Bowen Island (CA)

(73) Assignee: Intel Corporation, Santa Clara, CA (US)

( * ) Notice: Subject to any disclaimer, the term of this patent is extended or adjusted under 35 U.S.C. 154(b) by 952 days.

(21) Appl. No.: 13/690,868

(22) Filed: Nov. 30, 2012

(65) Prior Publication Data
US 2014/0156971 A1     Jun. 5, 2014

(51) Int. Cl.
*G06F 9/30* (2006.01)
*G06F 9/50* (2006.01)

(52) U.S. Cl.
CPC ........ *G06F 9/30036* (2013.01); *G06F 9/5066* (2013.01)

(58) Field of Classification Search
CPC ... G06F 9/30036; G06F 9/3887; G06F 9/5066
USPC .......................................................... 712/22
See application file for complete search history.

(56) References Cited

U.S. PATENT DOCUMENTS

| | | | |
|---|---|---|---|
| 6,857,063 B2 | 2/2005 | Moyer | |
| 8,056,080 B2 | 11/2011 | Alexander | |
| 8,495,604 B2 | 7/2013 | Bellows | |
| 2011/0161943 A1* | 6/2011 | Bellows et al. | 717/149 |
| 2012/0297163 A1 | 11/2012 | Breternitz | |
| 2014/0123147 A1* | 5/2014 | Pantaleoni | 718/102 |

OTHER PUBLICATIONS

Heinecke et al., "Extending a Highly Parallel Data Mining Algorithm to the Intel Many Integrated Core Architecture", Euro-Par 2011: Parallel Processing Workshops. Euro-Par 2011. Lecture Notes in Computer Science, vol. 7156. Springer, 2012.*
PCT International Search Report and Written Opinion issued in corresponding PCT/2013/048035 dated Nov. 29, 2013 (10 pages).

* cited by examiner

*Primary Examiner* — Benjamin Geib
(74) *Attorney, Agent, or Firm* — Trop Pruner & Hu, P.C.

(57) ABSTRACT

According to some embodiments, the workgroup divisibility requirement may be dispensed with on a selective or permanent basis, i.e. in all cases, particular cases or at particular times and/or under particular conditions. An application programming interface implementation may be allowed to launch workgroups with non-uniform local sizes. Two different local sizes may be used in a case of a one-dimensional workload.

27 Claims, 4 Drawing Sheets

RANGE SELECTION FOR DATA PARALLEL PROGRAMMING ENVIRONMENTS

BACKGROUND

This relates generally to data parallel programming environments with multiple data processing machines running multiple operators in parallel such as those running on single instruction multiple data (SIMD) machines.

In data parallel processing, separate processing elements perform the same operation on multiple data points simultaneously. SIMD is particularly amenable to graphics processors that process images. However, SIMD instructions are also executed on central processing units.

Computational work in various types of processors may be divided into a large number of compute instances. A compute instance may be known as a work item in some technologies. A work item is organized into workgroups that can collaborate and communicate. Programming environments may require that the number of work items in a work group, called the local size, divide evenly into the number of work items in the entire kernel launch, called the global size.

With image, and particularly video applications, the most natural global size is often tightly bound to the actual size of the image or the video being processed. In order to satisfy the requirement that the local size evenly divide into the global size, an application may be forced to launch more work items than are necessary and work around the existence of extra work items using conditionals in the kernel code.

This may cause increased code complexity. In addition extra conditionals may sometimes result in negative performance.

Since the work items are frequently mapped to SIMD lanes in a vector machine, the extra conditionals can cause a lower SIMD utilization. Further the complexity of the programming problem can impact performance, increasing significantly in the presence of workgroup barriers. Since barriers must be met unconditionally, they interact poorly with the need to execute work items conditionally.

BRIEF DESCRIPTION OF THE DRAWINGS

Some embodiments are described with respect to the following figures.

DETAILED DESCRIPTION

Figure 1:
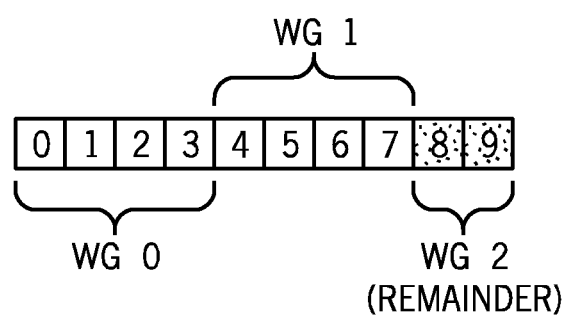
FIG. 1 is a depiction of a set of workgroups of different sizes according to one embodiment.
Figure 2:
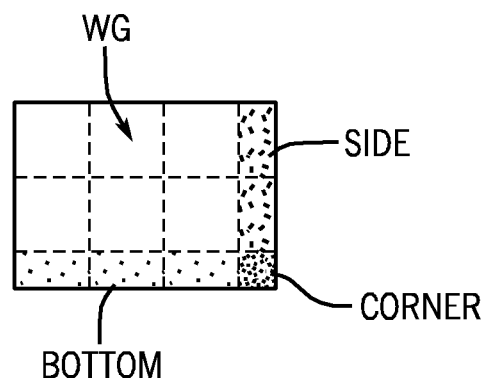
FIG. 2 is a depiction of workgroups of different sizes in a two-dimensional embodiment.

According to some embodiments, the workgroup divisibility requirement may be dispensed with on a selective or permanent basis, i.e. in all cases, particular cases or at particular times and/or under particular conditions. An application programming interface (API) implementation may be allowed to launch workgroups with non-uniform local sizes. Two different local sizes may be used in a case of a one-dimensional workload. One size, shown in FIG. 1 for the workgroups WG0 and WG1, may be used for all but one workgroup, WG2, called the remainder workgroup. The remainder workgroup has a different local size in one embodiment.

For multidimensional workloads, the number of different local sizes that could be used in a single kernel launch increases based on the number of remainder workgroups that are desirable to fully model the complete range. For example, in a two-dimensional workload range, a local workgroup size may also be two-dimensional. In this case there could be four different local workgroup sizes, one for the bulk of the work, one for the right edge, one for the bottom edge, one for the bottom right corner of the workgroup space.

To robustly support remainder workgroups and device side kernels, two kernel language changes may be made in some embodiments. Firstly, in order to allow existing algorithms, built for existing data parallel programming environments, to continue to work effectively, the remainder workgroup may be able to query not only its true local size but also the local size of its normal workgroups. For example to derive a workgroup's global index, one uses the local size of the normal workgroups, the index of the remainder workgroups within the space of the workgroups, and the index of the current work item within the space of work items in the current work item. Thus, a new built-in function may query the local sizes of the remainder workgroups.

Another desirable change in the kernel language may be to mark kernels with metadata that indicate that the kernel can be safely used with non-divisible global work ranges. Marking kernels may be done, for example, with pragmas, attributes, or key words in the language. This marking may resolve two issues. Firstly, in some implementations, small amounts of code may be added to each kernel to allow it to work in a more flexible way. If the programmer marks kernels with an attribute or other mechanism to indicate that they are safe for non-divisible work groups, the compiler knows which kernel should be compiled in this special way. Secondly, the marking resolves any potential backwards compatibility issues that might arise from running kernels with non-divisible workgroups. This may be because kernels without marking would not be allowed to launch in a non-divisible way and could gracefully detect and signal a failure to the programmer.

Data parallel frameworks that target graphics processing units and/or central processing units may have queue abstractions for launching kernel instances. Regardless of the device being targeted, individual kernel launches may be broken up into multiple launches each with dimensions that evenly divide a particular workgroup size. For central processing unit (CPU) implementations, this can be done entirely in software.

On a graphics processing unit platform, implementation may be done entirely in software or it may be done with the aid of hardware. Graphics processing unit implementations may have a command queue manipulated by the central processing unit and interpreted in hardware. One command type may be used to instruct the hardware to launch some number of same-sized workgroups on the hardware. With this hardware, data parallel programming systems may be implemented using one command per kernel launch.

Implementing unevenly sized workgroups can be done with a small number of additional commands in hardware. One command implements the normal sized workgroups and additional commands implement the remainder workgroups.

This is shown in FIG. 1 where one command is used for the normal workgroups and an additional command may be used for the remainder workgroups.

Alternatively, graphics processing unit hardware may be augmented to implement different workgroups with a single command from the central processing unit to reduce overhead. The command may be parameterized with all the information about the range size and normal workgroup size. Then the command launches threads for the normal remainder workgroups with the correct preloaded indices, execution masks, and initial barrier counts. This solution resolves the ease of use issue in data parallel programming systems and may improve application performance in some embodiments. It may also involve improvements in the application program interface and kernel language for the data parallel programming system as well as changes to how the programming system is implemented in software and hardware on graphics processors.

Figure 3:
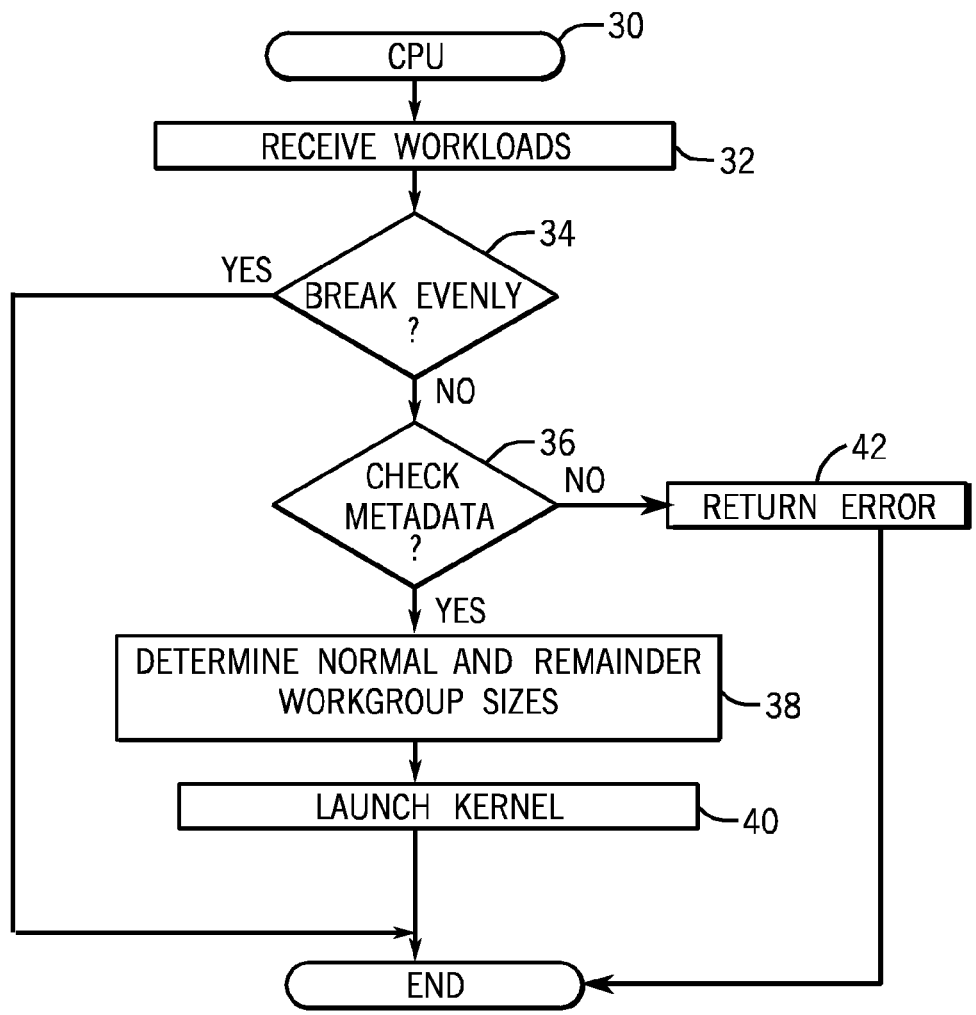
FIG. 3 is a flow chart for a sequence running a central processing unit according to one embodiment.

Referring to FIG. 3, a sequence implemented by a central processing unit 30 may be implemented in software, firmware and/or hardware. In software and firmware embodiments, it may be implemented by computer executed instructions stored in one or more non-transitory computer readable media such as a magnetic, optical or semiconductor storage.

The sequence 30 shown in FIG. 3 may begin by receiving workloads as indicated in block 32. A query at diamond 34 determines whether or not the local size workloads break evenly on global workgroup sizes. If not, then the flow checks for metadata indicating whether the programmer allowed non-divisible kernel launch (diamond 36). If no metadata return error (block 42) and the flow ends. If there is metadata, determine normal and remainder work group sizes (block 38) and launch kernel (block 40).

Figure 4:
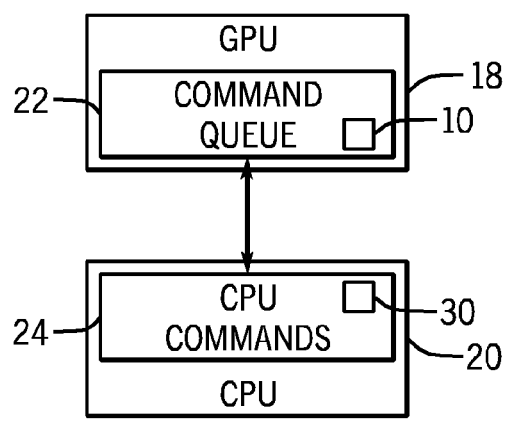
FIG. 4 is a depiction of a platform including a graphics processing unit and a central processing unit according to one embodiment.

Referring to FIG. 4 in accordance with one embodiment, a platform may include a graphics processing unit 18 coupled to a central processing unit 20. The graphics processing unit 18 may include a command queue 22 that includes the range selection code 10 in some embodiments. The central processing unit 20 may include a central processing unit command set 24 that includes the sequence 30 in some embodiments.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

Figure 5:
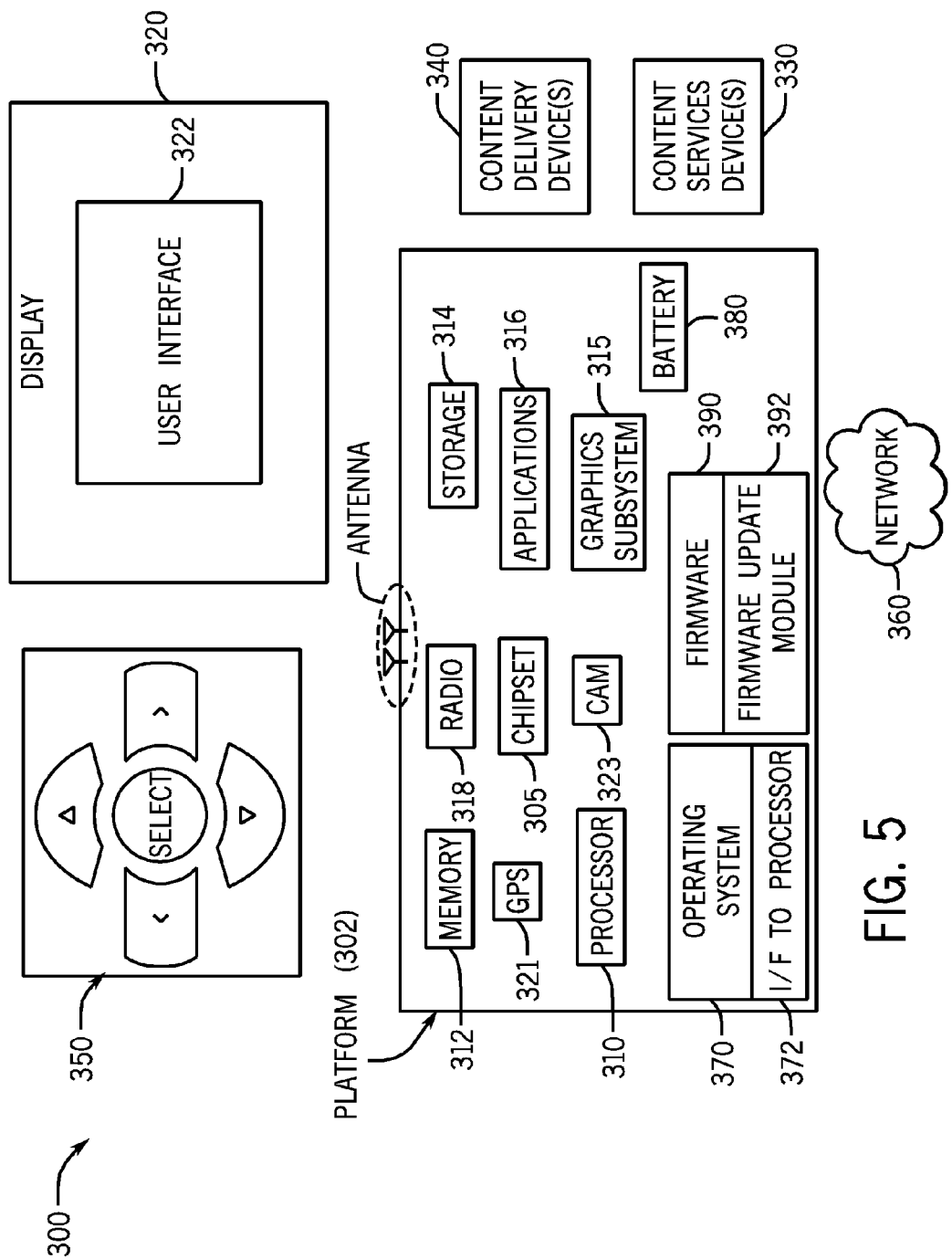
FIG. 5 is a system schematic for one embodiment to the present invention.

FIG. 5 illustrates an embodiment of a system 300. In embodiments, system 300 may be a media system although system 300 is not limited to this context. For example, system 300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 300 comprises a platform 302 coupled to a display 320. Platform 302 may receive content from a content device such as content services device(s) 330 or content delivery device(s) 340 or other similar content sources. A navigation controller 350 comprising one or more navigation features may be used to interact with, for example, platform 302 and/or display 320. Each of these components is described in more detail below.

In embodiments, platform 302 may comprise any combination of a chipset 305, processor 310, memory 312, storage 314, graphics subsystem 315, applications 316 and/or radio 318. Chipset 305 may provide intercommunication among processor 310, memory 312, storage 314, graphics subsystem 315, applications 316 and/or radio 318. For example, chipset 305 may include a storage adapter (not depicted) capable of providing intercommunication with storage 314.

Processor 310 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 310 may comprise dual-core processor(s), dual-core mobile processor(s), and so forth.

Memory 312 may be implemented as a volatile memory device such as, but not limited to, a Random Access Memory (RAM), Dynamic Random Access Memory (DRAM), or Static RAM (SRAM).

Storage 314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 314 may comprise technology to increase the storage performance enhanced protection for valuable digital media when multiple hard drives are included, for example.

Graphics subsystem 315 may perform processing of images such as still or video for display. Graphics subsystem 315 may be a graphics processing unit (GPU) or a visual processing unit (VPU), for example. An analog or digital interface may be used to communicatively couple graphics subsystem 315 and display 320. For example, the interface may be any of a High-Definition Multimedia Interface, DisplayPort, wireless HDMI, and/or wireless HD compliant techniques. Graphics subsystem 315 could be integrated into processor 310 or chipset 305. Graphics subsystem 315 could be a stand-alone card communicatively coupled to chipset 305.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 318 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 318 may operate in accordance with one or more applicable standards in any version.

In embodiments, display 320 may comprise any television type monitor or display. Display 320 may comprise, for example, a computer display screen, touch screen display, video monitor, television-like device, and/or a television. Display 320 may be digital and/or analog. In embodiments, display 320 may be a holographic display. Also, display 320 may be a transparent surface that may receive a visual projection. Such projections may convey various forms of information, images, and/or objects. For example, such projections may be a visual overlay for a mobile augmented reality (MAR) application. Under the control of one or more software applications 316, platform 302 may display user interface 322 on display 320.

In embodiments, content services device(s) 330 may be hosted by any national, international and/or independent service and thus accessible to platform 302 via the Internet, for example. Content services device(s) 330 may be coupled to platform 302 and/or to display 320. Platform 302 and/or content services device(s) 330 may be coupled to a network 360 to communicate (e.g., send and/or receive) media information to and from network 360. Content delivery device(s) 340 also may be coupled to platform 302 and/or to display 320.

In embodiments, content services device(s) 330 may comprise a cable television box, personal computer, network, telephone, Internet enabled devices or appliance capable of delivering digital information and/or content, and any other similar device capable of unidirectionally or bidirectionally communicating content between content providers and platform 302 and/display 320, via network 360 or directly. It will be appreciated that the content may be communicated unidirectionally and/or bidirectionally to and from any one of the components in system 300 and a content provider via network 360. Examples of content may include any media information including, for example, video, music, medical and gaming information, and so forth.

Content services device(s) 330 receives content such as cable television programming including media information, digital information, and/or other content. Examples of content providers may include any cable or satellite television or radio or Internet content providers. The provided examples are not meant to limit embodiments of the invention.

In embodiments, platform 302 may receive control signals from navigation controller 350 having one or more navigation features. The navigation features of controller 350 may be used to interact with user interface 322, for example. In embodiments, navigation controller 350 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 350 may be echoed on a display (e.g., display 320) by movements of a pointer, cursor, focus ring, or other visual indicators displayed on the display. For example, under the control of software applications 316, the navigation features located on navigation controller 350 may be mapped to virtual navigation features displayed on user interface 322, for example. In embodiments, controller 350 may not be a separate component but integrated into platform 302 and/or display 320. Embodiments, however, are not limited to the elements or in the context shown or described herein.

In embodiments, drivers (not shown) may comprise technology to enable users to instantly turn on and off platform 302 like a television with the touch of a button after initial boot-up, when enabled, for example. Program logic may allow platform 302 to stream content to media adaptors or other content services device(s) 330 or content delivery device(s) 340 when the platform is turned "off." In addition, chip set 305 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In FIG. 5, a global positioning system (GPS) 321, content addressable memory (CAM) 323, operating system (OS) 370, an interface (I/F) to processor 372, a battery 380, firmware 390, and firmware update module 392 are included.

In various embodiments, any one or more of the components shown in system 300 may be integrated. For example, platform 302 and content services device(s) 330 may be integrated, or platform 302 and content delivery device(s) 340 may be integrated, or platform 302, content services device(s) 330, and content delivery device(s) 340 may be integrated, for example. In various embodiments, platform 302 and display 320 may be an integrated unit. Display 320 and content service device(s) 330 may be integrated, or display 320 and content delivery device(s) 340 may be integrated, for example. These examples are not meant to limit the invention.

In various embodiments, system 300 may be implemented as a wireless system, a wired system, or a combination of both. When implemented as a wireless system, system 300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
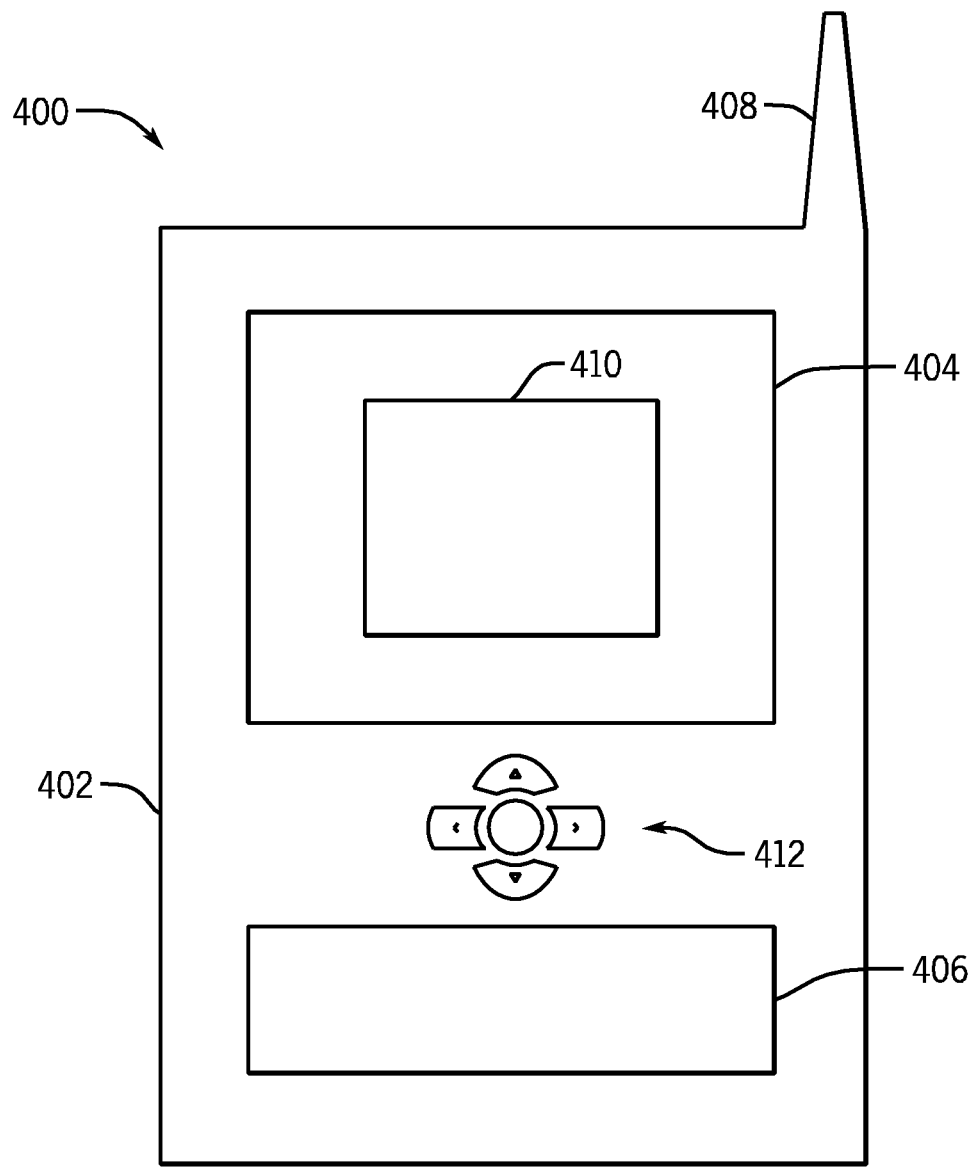
FIG. 6 is a front elevational view of one embodiment.

As described above, system 300 may be embodied in varying physical styles or form factors. FIG. 6 illustrates embodiments of a small form factor device 400 in which system 300 may be embodied. In embodiments, for example, device 400 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 310 may communicate with a camera 322 and a global positioning system sensor 320, in some embodiments. A memory 312, coupled to the processor 310, may store computer readable instructions for implementing the sequences shown in FIG. 3 in software and/or firmware embodiments.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 318 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 318 may operate in accordance with one or more applicable standards in any version.

As shown in FIG. 6, device 400 may comprise a housing 402, a display 404, an input/output (I/O) device 406, and an antenna 408. Device 400 also may comprise navigation features 412. Display 404 may comprise any suitable display unit 410 for displaying information appropriate for a mobile computing device. I/O device 406 may comprise any suitable I/O device for entering information into a mobile computing device. Examples for I/O device 406 may include an alphanumeric keyboard, a numeric keypad, a touch pad, input keys, buttons, switches, rocker switches, microphones, speakers, voice recognition device and software, and so forth. Information also may be entered into device 400 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving a work item;
   determining whether the work item can be divided into a integral number of workgroups of a given size; and
   if the work item cannot be divided into an integral number of workgroups of the given size dividing the work item into a one or more workgroups of the given size and a workgroup of a size different than said given size.

2. The method of claim 1 including implementing a single instruction multiple data processor that handles workgroups of at least two different sizes.

3. The method of claim 1 including handling multidimensional workloads with more than two workgroup sizes.

4. The method of claim 1 including enabling a remainder workgroup to query both its true local size and the local size of workgroups other than said remainder workgroup.

5. The method of claim 1 including marking kernels to indicate whether the kernel can be used with global workgroups that cannot be divided into an integral number of work items per workgroup without a remainder.

6. The method of claim 1 including checking whether a local sized workload breaks evenly on a global workgroup size.

7. The method of claim 6 including determining whether non-divisible kernel launch is permitted.

8. The method of claim 7 including if non-divisible kernel launches is permitted, determining normal and remainder workgroup sizes.

9. The method of claim 8 including determining based on metadata.

10. The method of claim 1 including implementing a graphics processor.

11. One or more non-transitory computer readable media storing computer instructions executable to perform a sequence comprising:
  receiving a work item;
  determining whether the work item can be divided into a integral number of workgroups of a given size; and
  if the work item cannot be divided into an integral number of workgroups of the given size dividing the work item into a one or more workgroups of the given size and a workgroup of a size different than said given size.

12. The media of claim 11, the sequence further including implementing a single instruction multiple data processor that handles workgroups of at least two different sizes.

13. The media of claim 11, the sequence further including handling multidimensional workloads with more than two workgroup sizes.

14. The media of claim 11, the sequence further including enabling a remainder workgroup to query both its true local size and the local size of workgroups other than said remainder workgroup.

15. The media of claim 11, the sequence further including marking kernels to indicate whether the kernel can be used with global workgroups that cannot be divided into an integral number of work items per workgroup without a remainder.

16. The media of claim 11, the sequence further including checking whether a local sized workload breaks evenly on a global workgroup size.

17. The media of claim 16, the sequence further including determining whether non-divisible kernel launch is permitted.

18. The media of claim 17, the sequence further including, if non-divisible kernel launch is permitted, determining normal and remainder workgroup sizes.

19. The media of claim 18, the sequence further including determining based on metadata.

20. The media of claim 11, the sequence further including implementing a graphics processor.

21. An apparatus comprising:
  a graphics processor that receives a work item, determines whether the work item can be divided into a integral number of workgroups of a given size, if the work item cannot be divided into an integral number of workgroups of the given size dividing the work item into a one or more workgroups of the given size and a workgroup of a size different than said given size; and
  a memory coupled to said processor.

22. The apparatus of claim 21, said processor to implement a single instruction multiple data processor that handles workgroups of at least two different sizes.

23. The apparatus of claim 21, said processor to handle multidimensional workloads with more than two workgroup sizes.

24. The apparatus of claim 21, said processor to enable a remainder workgroup to query both its true local size and the local size of workgroups other than said remainder workgroup.

25. The apparatus of claim 21, said processor to mark kernels to indicate whether the kernel can be used with global workgroups that cannot be divided into an integral number of work items per workgroup without a remainder.

26. The apparatus of claim 21 including an operating system.

27. The apparatus of claim 21 including a battery.

* * * * *